United States Patent [19]

Berg et al.

[11] Patent Number: 4,807,351
[45] Date of Patent: Feb. 28, 1989

[54] METHOD FOR ATTACHING AN END-FITTING TO A DRIVE SHAFT TUBE

[75] Inventors: Kenneth R. Berg, Trabucco Canyon; Roger L. Sundquist, El Toro; Liem V. Truong, Anaheim, all of Calif.

[73] Assignee: ASEA Composites, Inc., Irvine, Calif.

[21] Appl. No.: 158,013

[22] Filed: Feb. 18, 1988

[51] Int. Cl.[4] ............................................. B23P 11/00
[52] U.S. Cl. ......................................... 29/432; 29/525; 403/282; 403/283; 403/359
[58] Field of Search .......................... 29/432, 525, 423; 403/277, 279, 280, 281, 282, 283, 359; 464/181

[56] References Cited

U.S. PATENT DOCUMENTS 4,663,819  5/1987  Traylor ............................. 29/525 X Primary Examiner—Timothy V. Eley
Attorney, Agent, or Firm—Leonard Tachner

[57] ABSTRACT

A method for attaching an end-fitting, such as a yoke-type end-fitting, to a tubular drive shaft of the type used in the drive line of vehicles, comprises the steps of deforming the end of the drive shaft tube such as by swaging it onto a tool or replica of the end-fitting so that the inner diameter of the tube end is less than the outer diameter of the end-fitting; and then press-fitting the end-fitting into the deformed tube end. The resulting attachment is free of slippage that otherwise results from directly swaging the tube end onto the end-fitting. A preferred embodiment employs smooth undulating splines on the end-fitting and an outer sleeve over the tube end and utilizes electromagnetic-induced swaging.

7 Claims, 4 Drawing Sheets

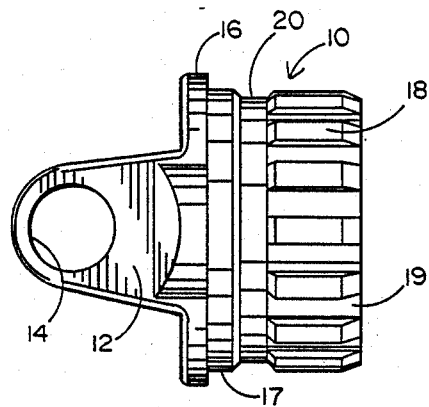
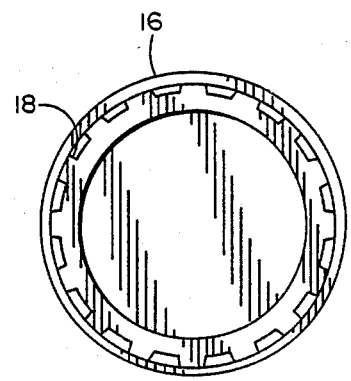
FIG. 1 PRIOR ART          FIG. 2 PRIOR ART
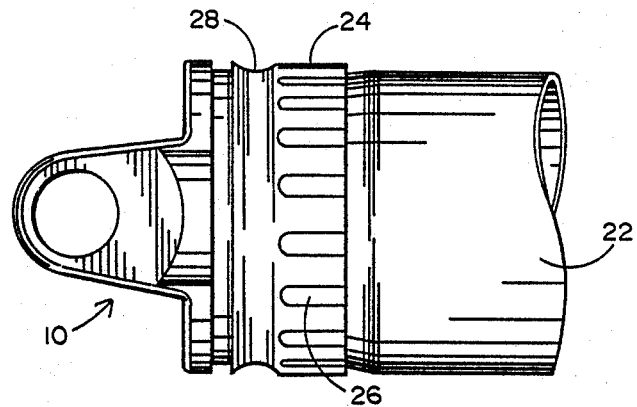
FIG. 3 PRIOR ART
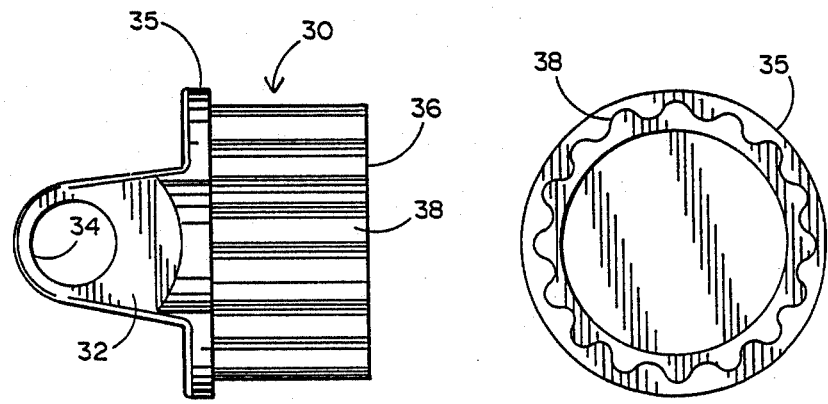
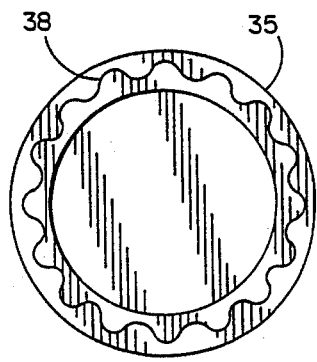
FIG. 4          FIG. 5

METHOD FOR ATTACHING AN END-FITTING TO A DRIVE SHAFT TUBE

BACKGROUND OF THE INVENTION

1. Field of the Invention

The present invention relates generally to a method of fabricating automotive drive shafts and more specifically, to a method of attaching metal end-fittings such as an automotive U-joint yoke to tubular shafts which rotate at high rates of speed and transmit torque and axial forces such as when in use as a vehicle drive shaft.

2. Prior Art

The attachment of end-fittings to metal tubes has historically been accomplished by welding the joint between the end-fittings and the tubes. Many other techniques are available with varying degrees of success. Among these other methods are the use of pins, rivets, bolts, adhesives, and such mechanical methods as splines, keyways, polygon matching shapes, shrink fits and press-fits. However, none of these attachment methods has been satisfactorily applied to drive shafts of vehicles or are in continuing use in vehicles today. One recent innovation used in the process of attaching an end-fitting to a tubular drive shaft, known under the trademark MAGNAFORM, employs a very high electromagnetic-induced force to swage a tube onto a fitting and is in use today, but with limited success. In one such electromagnetic force-induced attachment process being used today by a major automotive company, a yoke-type end-fitting seen in FIG. 1 of the accompanying drawings is provided with a plurality of axially directed splines of substantially rectangular or trapezoidal cross-section and a circumferentially disposed recess. The outer diameter of the splines is sufficiently small to allow the splines to be placed into the end of the tubular drive shaft. A sleeve is then placed on the outside of the tubular drive shaft in substantial alignment with the splines. Prior to the application of the aforementioned electromagnetic swaging force, the outer sleeve is sufficiently larger in diameter than the tubular drive shaft to allow it to be easily slid over the exterior surface of the drive shaft. The combination of drive shaft, end-fitting and sleeve is then subjected to the aforementioned electromagnetic forces to swage the sleeve thereby reducing its diameter until it firmly grasps the drive shaft tube and the splines of the yoke end-fitting. In fact, the force is so great that it causes the sleeve and the tube to become deformed and take on a rough replication of the shape of the splines and the circumferential recess, thereby firmly attaching the drive shaft tube to the yoke end-fitting. The circumferential recess is designed to prevent axially directed forces from permitting the end-fitting to slip out of the tube and the splines are primarily intended to prevent slippage between the tube and the end-fitting upon the application of a high level of torque through the drive shaft. Unfortunately, the results of such a method for attaching the drive shaft tube to the end-fitting have been less than satisfactory. More specifically, it has been found that irrespective of the force used to electromagnetically swage the outside sleeve to the tube, after the electromagnetic force is removed there is an inherent relaxation of the metal of which the sleeve and the tube are comprised. Consequently, when torque is applied to the drive shaft in the vehicle there is a small amount of slippage between the splines and the drive shaft tube which produces a loud and irritating sound which has resulted in a large number of consumer complaints.

A large number of revisions have been made in order to attempt to solve this problem. By way of example, the number of splines has been increased and decreased. The shape of the splines has been changed. The materials have been coated with a variety of additional materials including nickel, copper, anodizing and abrasive paints. Wall dimensions have been varied. The splines have been sandblasted. Various lubrications have been applied to the splines and the interior of the drive shaft tube. The application of electromagnetic force to swage the exterior sleeve has been varied including applying the force twice to increase the forces associated with the attachment process. O-rings have been placed between the splines and the interior of the drive shaft tube. The yoke has been tapered, riveted and pinned and the round shape of the tube has been changed to oval. Unfortunately, all of these attempts at solving the aforementioned problem have been unsatisfactory and the main disadvantage previously described, namely, a loud, unpleasant sound of slippage upon the application of torque between the splines and the drive shaft tube, has persisted. There is therefore a need to provide a solution which permits the advantageous use of swaging a tube onto the drive shaft fitting while concurrently solving the aforementioned problem to provide a repeatedly reliable end-fitting attachment which does not produce any slippage, particularly any slippage discernable in the unpleasant audible manner as previously described.

SUMMARY OF THE INVENTION

The present invention satisfies the aforementioned need by providing a novel method for attaching a drive shaft tube to an end-fitting while, in a preferred embodiment, still utilizing the electromagnetic force swaging step of the prior art, but resulting in an interconnection between the drive shaft tube and the end-fitting which does not slip and therefore obviates the aforementioned problem of the prior art. The invention provides a superior attachment which overcomes the problems experienced in the previous electromagnetic process. Three elements are employed to produce an efficient interconnection. One element involves the configuration of the stub tube portion of the end-fitting which is inserted into the drive shaft tube. A second element is a reduced diameter tool for the electromagnetic swaging of a sleeve and the tube onto this tool which is subsequently removed. The third element is the pressing of the end-fitting into the shaft by sufficient force based on engineering calculations to take the required torque. The configuration of the stub tube portion of the end-fitting is designed to distribute the forces of torque at the splines over a greater surface area. Accordingly, instead of using rectangular or trapezoidally cross-sectioned splines as is done in the prior art, the splines of the present invention are preferably smooth continuous undulating surfaces much like that of a sine wave without any substantial sudden discontinuities where the torque forces would be concentrated and increase the likelihood of slippage. Providing a yoke-type end-fitting having the aforementioned continuous surface splines is the first step of the novel process of the present invention. The second step is to provide a tool substantially identical in shape to the aforementioned modified stub tube end-fitting, but which has a reduced diameter. The next step involves placing the reduced diameter tool into the tubular drive shaft and placing the same type of ring or sleeve over the outer surface of the drive shaft tube. The next step employs the aforementioned electromagnetic swaging force to reduce the diameter of the exterior sleeve and of the drive shaft tube around the tool until the sleeve and drive shaft substantially conform to the shape of the tool. The next step in the process of the present invention is to apply an axial force to the tool away from the drive shaft tube until the tool is removed from the drive shaft tube. This removal is readily accommodated because the circumferential recess of the prior art end-fitting is omitted in the end-fitting disclosed herein. The next step in the process of the present invention is to press fit the end-fitting into the swaged drive shaft tube and sleeve. It will be understood that the diameter of this modified end-fitting, being greater than the diameter of the aforementioned tool, is also greater than the inner diameter of the swaged drive shaft tube. Accordingly, it is necessary to apply a sufficiently large axially directed force to push the stub tube of the end-fitting into the drive shaft tube. In one embodiment of the present invention, approximately 20,000 lbs. of axial force is utilized to press-fit the splined end-fitting into the swaged drive shaft tube.

OBJECTS OF THE PRESENT INVENTION

It is therefore a principal object of the present invention to provide an improved method for attaching a drive shaft end-fitting to a drive shaft tube while obviating any slippage between the tube and the end-fitting that would otherwise create a disturbing loud noise that could be inimical to or entirely thwart the commercial success of the vehicle in which such drive shaft were installed.

It is an additional object of the present invention to provide an improved method for attaching a drive shaft end-fitting to a drive shaft tube using the step of electromagnetically swaging the end of the tube by employing a tool of a shape identical to the fitting but of reduced diameter and then thereafter removing the tool and press-fitting the larger diameter end-fitting into the end of the tube to substantially increase the attachment forces between the tube and the end-fitting.

It is still an additional object of the present invention to provide an improved method for attaching an end-fitting to a drive shaft, the process including the step of providing a drive shaft tube, at least the end of which is of reduced diameter and then expanding the diameter of the end of the tube during a press-fit installation of the end-fitting therein.

It is still an additional object of the present invention to provide an improved method for attaching an end-fitting to a drive shaft tube, the end fitting of the type having a plurality of splines of smooth continuous shape, the process including the steps of conforming the end of the drive shaft tubes to the shape of the fitting but of reduced diameter and then press-fitting the smooth splines of the end fitting into the tube causing the ends of the tube to expand and to thereby tightly engage the splines of the end-fitting.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIG. 1 is a side view of a prior art end-fitting;

FIG. 2 is an end view of the end-fitting of FIG. 1;

FIG. 3 is a side view of the end-fitting of FIG. 1 shown installed in a drive shaft tube using the swaged sleeve process of the prior art;

FIG. 4 is a side view of the improved end-fitting of the present invention;

FIG. 5 is an end view of the improved end-fitting of the present invention;

DETAILED DESCRIPTION OF A PREFERRED EMBODIMENT

Figure 6:
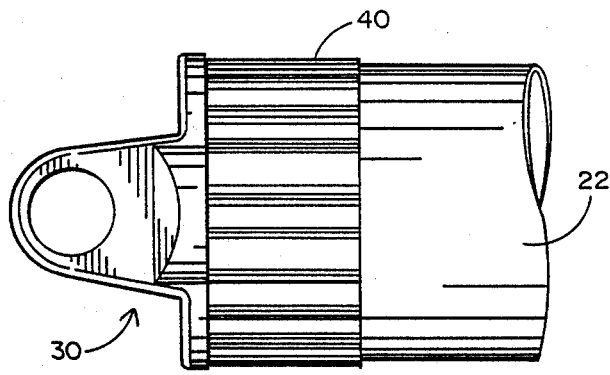
FIG. 6 is an exterior side view of the resultant end-fitting drive shaft tube combination of the present invention.

Referring first to FIGS. 1–3, it will be seen that a prior art end-fitting 10 is provided with a yoke 12 having a pair of apertures 14, a first shoulder 16, a second shoulder 17, and a stub tube 19 from which there radially extends a plurality of rectangular or trapezoidally-shaped splines 18. Between the splines 18 and the second shoulder 17 there is a circumferential recess 20. The previously described prior art method for attaching the prior art end-fitting 10 to a tubular drive shaft 22, results in the end-fitting configuration shown in FIG. 3. It will be seen in FIG. 3 that a sleeve 24 has been swaged around the drive shaft tube 22 to radially compress the drive shaft tube toward the splines 18 to the extent that both the end of the drive shaft tube 22 and the sleeve 24 are deformed to the extent that spline deformations 26 and recess deformation 28 are visible exterior to the combination of the end-fitting and the tube. However, it is this prior art attachment method and the resulting end-fitting and drive shaft tube combination, that produces the aforementioned disadvantage of permitting a degree of slippage when normally encountered torque and reversed torque are applied to the drive shaft thereby creating the aforementioned loud and irritating sound which has been deemed unacceptable.

Referring now to FIGS. 4 and 5 it will be seen that the end fitting 30 of the present invention is similar in many respects to the prior art end-fitting 10. More specifically, end-fitting 30 also includes a yoke 32 having a pair of apertures 34 and a shoulder 35 as well as a stub tube 36 which is provided with a plurality of splines 38. However, end-fitting 30, unlike the prior art end-fitting 10, does not have a circumferential recess and unlike the splines 18 of the prior art end-fitting 10, the splines 38 of end-fitting 30 provide an undulating surface much like a sinewave wrapped around in a circular configuration whereby there are no discontinuities but rather smooth, continuous surfaces. These smooth, continuous surfaces of splines 38 provide a more uniform distribution of compressive engagement between the end-fitting 30 and the drive shaft tube 22, the interconnection of which is shown in FIG. 6, and which results from the novel inventive method to be disclosed hereinafter. As seen in FIG. 6, the result of the novel inventive method of the present invention also produces a drive shaft tube and end-fitting interconnection in which there is an overlapping sleeve 40 which, in a preferred embodiment of the method of the present invention, is also swaged by the aforementioned electromagnetic-induced forming step.

Figure 7:
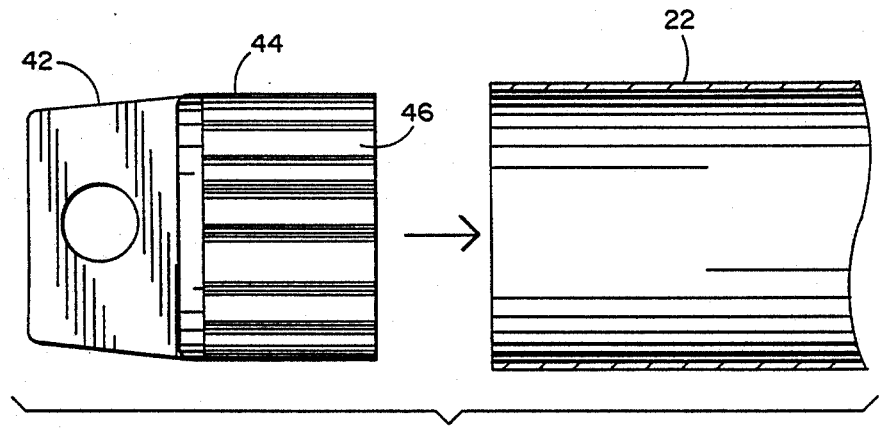
FIGS. 7, 8 and 9 provide sequential views of steps of the present invention utilizing a reduced diameter tool thereof.
Figure 8:
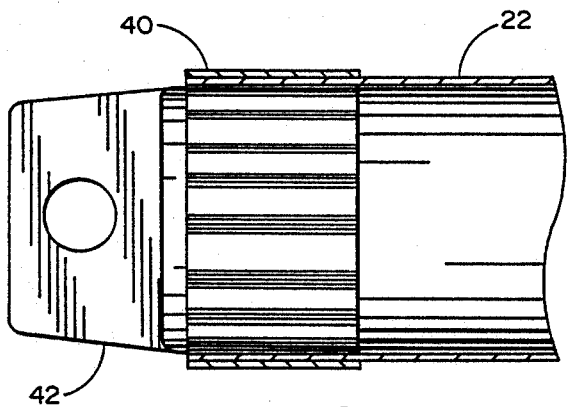

The novel method of the present invention may be best understood by referring to FIGS. 7 and 8 wherein it is shown that a tool 42 is inserted into the end of a drive shaft tube 22. Tool 42 is substantially identical in shape to end-fitting 30 shown in FIG. 4. More specifically, tool 42 is also provided with a stub tube 44 that includes a plurality of splines 46 identical in configuration to the splines 38 of stub tube 36 of end-fitting 30. However, there is an important difference between the tool 42 and the end-fitting 30, namely, a difference in dimensions. More specifically, the diameter of the stub tube 44 is smaller in diameter than the corresponding dimensions of end fitting 30.

Figure 9:
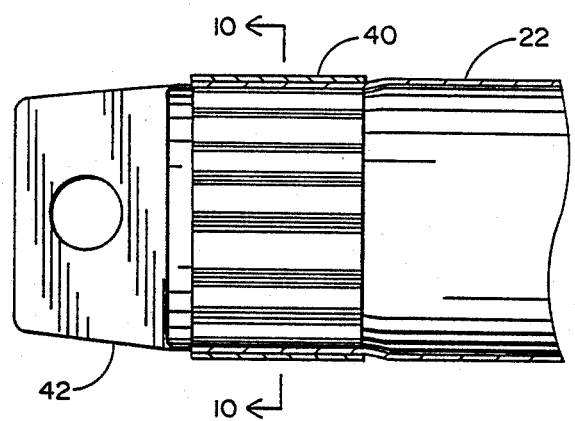
Figure 10:
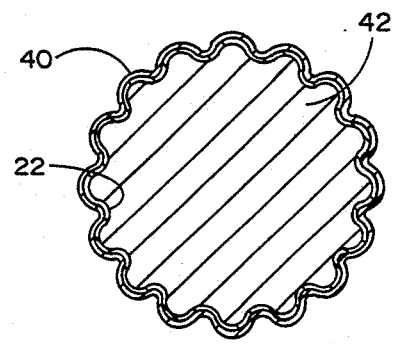
FIG. 10 is a cross-sectional axial view taken along lines 10—10 of FIG. 9.

The first step in the process of the present invention is to insert tool 42 into the end of drive shaft tube 22 and to provide the outer sleeve 40 along the outside surface of tube 42 in substantial alignment with the splines 46 of the tool 42. The next step in the sequence of the present invention is to apply a swaging force to the sleeve 40 and the drive shaft tube 22 such as by electromagnetic force-induced forming previously described to produce the result shown in FIGS. 9 and 10. More specifically, just as in the prior art illustrated in FIGS. 1–3, and particularly FIG. 3, the radially compressive forces produced by the electromagnetic swaging results in a decrease in the diameter of sleeve 40 and that portion of drive shaft 42 positioned within sleeve 40. The result is a deformation of the sleeve 40 and that portion of the drive shaft tube 22 over the splines 46 thereby causing the sleeve 40 and the drive shaft tube 22 adjacent sleeve 40 to assume the undulated configuration of the splines on the stub tube 44 of the tool 42 in the manner illustrated in cross-section in FIG. 10.

Figure 11:
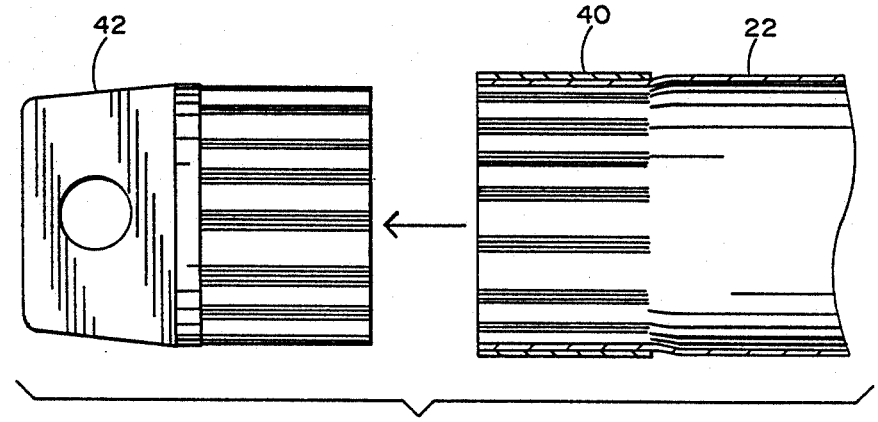
FIG. 11 illustrates the step of removing the tool from the end of the drive shaft tube of the present invention.

The next step in the process of the present invention is to remove the tool 42 by applying an axially directed force on the tool 42. Because the tool 42 does not provide the circumferential recess 20 of the prior art end-fitting 10 and further because there is an inherent relaxation of the compressive engagement between the stub tube 44 of tool 42 and the surrounding deformed sleeve 40 and drive shaft tube 22, the force required to remove tool 42 is relatively moderate and can be accomplished with conventional machinery well-known in the art. This step of the process, namely, removing tool 42 after the swaging of sleeve 40 is illustrated in FIG. 11.

Figure 12:
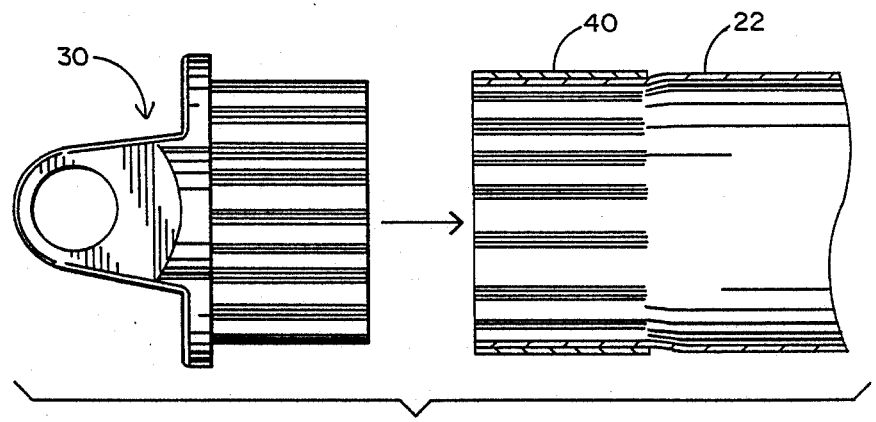
FIG. 12 illustrates the step of inserting the end-fitting into the swaged tube end of the present invention.
Figure 13:
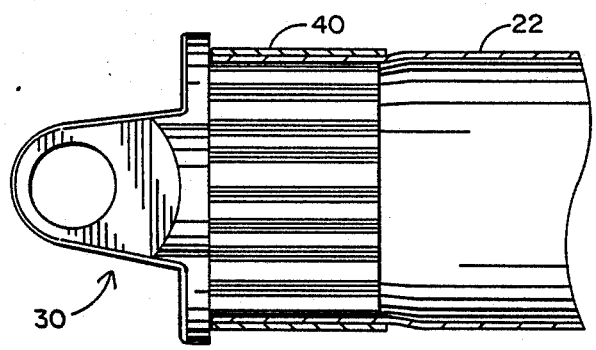
FIG. 13 is a partial cross-sectional view of the attachment between the drive shaft tube and end-fitting using the method of the present invention.

The final step of the novel process of the present invention is illustrated in FIGS. 12 and 13. More specifically, end-fitting 30 is press-fit into the interior of drive shaft tube 22, preferably until the shoulder 35 engages the end of the drive shaft tube and the sleeve 40. Because the outer diameter of the stub tube portion 36 of end-fitting 30 is of greater dimension than the corresponding dimension of tool 42, a substantial force must be exerted to press-fit the end-fitting 30 into the drive shaft tube 22. The actual force required will, of course, depend upon the precise difference in the dimensions of the respective stub tubes of the end fitting 30 and the tool 42 which will, in turn, be dictated by the torque resistance desired. The torque that must be withstood is that which will not permit any slippage whatsoever between the drive shaft tube 22 and the end fitting 30.

Such actual differences in dimensions, torque resistance and axial force for press-fitting the end-fitting 30 into the drive shaft tube 22 are readily calculated in a manner well-known in the art and need not be described herein in any detail. Suffice it to say that in one embodiment of the invention herein, approximately 20,000 lbs. is sufficient to press-fit the end-fitting into the drive shaft tube and such axial force is readily available using conventional machinery in a manner well-known in the art.

Those having skill in the art will now recognize the substantial difference between the completed attachment of FIG. 3 formed in accordance with the aforementioned prior art method of attachment and the resultant attachment of FIGS. 6 and 13 produced by the novel process of the present invention. More specifically, in the prior art result of FIG. 3, sleeve 24 and drive shaft tube 22 are compressed against the prior art splines 18, and then allowed to relax, resulting in a substantial decrease in the compressive engagement between those three members. In the novel process of the present invention, when the end-fitting 30 is press-fit into the interior of drive shaft tube 22, the radial force applied is outward rather than inward, that is, toward the exterior of tube 22 thereby producing a substantially greater radial force between the stub tube portion of end fitting 30 and the surrounding portion of drive shaft 22 and the sleeve 40. These substantially greater radial compressive forces are maintained (not relaxed) and produce a much tighter engagement between these members as compared to the prior art configuration and the additional force is sufficient to preclude the aforementioned slippage of the prior art thereby obviating the slippage-induced loud sounds of the prior art which are so irritating and unacceptable to the ultimate consumer. Furthermore, unlike the prior art configuration of FIGS. 1–3, the smooth, continuous spline configuration of the end-fitting 30 of the present invention, more evenly distributes the compressive radial forces about the stub end of end-fitting 30 thereby also reducing the opportunity for slippage upon the application of comparable torque.

It will now be understood that what has been disclosed herein comprises a novel method for attaching an end-fitting to a tubular drive shaft whereby to prevent slippage between those two members upon the application of torque of a magnitude typically encountered by a vehicle drive shaft. The method comprises the steps of placing a tool of substantially identical shape as the end-fitting, into the end of the tube the outer surface of which is surrounded by a sleeve. However, the diameter of the splined portion of the tool is of smaller dimensions than the ultimate end-fitting so that upon application of a swaging force, such as by electromagnetic magnaforming, the resultant deformation of the drive shaft tube and sleeve results in a drive shaft tube inner diameter which is smaller than the outer diameter of the end-fitting.

The tool is then removed and the end fitting is press-fit into the end of the tube by applying an axial force on the end fitting to compress it into the end of the drive shaft tube while expanding the tube and the sleeve and forming a firm, radial force engagement between the end-fitting, the drive shaft tube and the sleeve. In a preferred embodiment of the invention disclosed herein, both the tool and the ultimately attached end-fitting have a splined configuration which is of a smooth, continuous shape such as undulations which resemble a sinewave in a circular configuration. The combination of the smooth, continuous shape of the splines of the tool and end-fitting distribute the compressive engagement forces more uniformly around the stub tube portion of the end-fitting. Additionally, the expansion of the drive shaft tube and sleeve in the process of installing the end-fitting into the end of the drive shaft tube results in a much firmer engagement between the respective members which precludes any opportunity for slippage therebetween at comparable torque thereby avoiding slippage and the resultant irritating noise produced by the prior art method of attachment.

Those having skill in the art to which the present invention pertains will now, as a result of the applicant's teaching herein, perceive various modifications and additions which may be made to the invention. By way of example, while a preferred embodiment of the invention herein described employs a step of swaging the sleeve and the end of the drive shaft tube onto a tool by using an electromagnetic force induced process, such swaging may be accomplished by other means such as by a radial contraction force provided by a mechanical interaction rather than an electromagnetic induced swaging. Furthermore, the novel process of the present invention may be advantageously accomplished to produce virtually the same result using an end-fitting having splines of shapes other than those specifically described herein. In addition, one can commence the process of the present invention with a tube of smaller diameter thereby obviating the requirement for swaging. Accordingly, all such modifications and additions are deemed to be within the scope of the present invention which is to be limited only by the claims appended hereto.

We claim:

1. A method for attaching an end-fitting to a drive shaft tube, comprising the following steps:
   (a) providing a smaller dimension replica of the end-fitting;
   (b) inserting said replica into the end of said tube;
   (c) swaging said tube end onto said replica;
   (d) removing said replica from said tube end; and
   (e) press-fitting said end-fitting into said tube end.

2. The method recited in claim 1 wherein said swaging step comprises applying an electromagnetic, radially directed force to said tube end.

3. The method recited in claim 1 further comprising the step of placing a sleeve over said tube end before performing step c).

4. The method recited in claim 1 wherein said end-fitting and said replica are both subject to the additional step of providing smooth, continuous splines for insertion into said tube end.

5. A method for attaching an end-fitting to a drive shaft tube, the end-fitting of the type having a splined stub tube, the drive shaft tube of the type typically installed in the drive line of a vehicle for transmitting torque from an engine to an axle; the method comprising the following steps:
   (a) providing a smaller dimension replica of the end-fitting;
   (b) inserting the stub end of said replica into the end of said drive shaft tube;
   (c) swaging said tube end onto said replica with sufficient force to deform said tube end to substantially conform to the outer shape and dimensions of said replica stub end;
   (d) applying an axial force to said replica to remove said replica from said tube end;
   (e) applying an axial force, directed opposite to the direction of the axial force of step d), against said end-fitting for press-fitting said stub tube of said end-fitting into said tube end.

6. The method recited in claim 5 wherein in step (e) said end-fitting is first aligned with said tube end so that the splines of said stub tube are in substantial alignment with the corresponding deformations of said tube end.

7. The method recited in claim 5 wherein said swaging step comprises applying an electromagnetic, radially compressive force to said tube end.

* * * * *